UNITED STATES PATENT OFFICE.

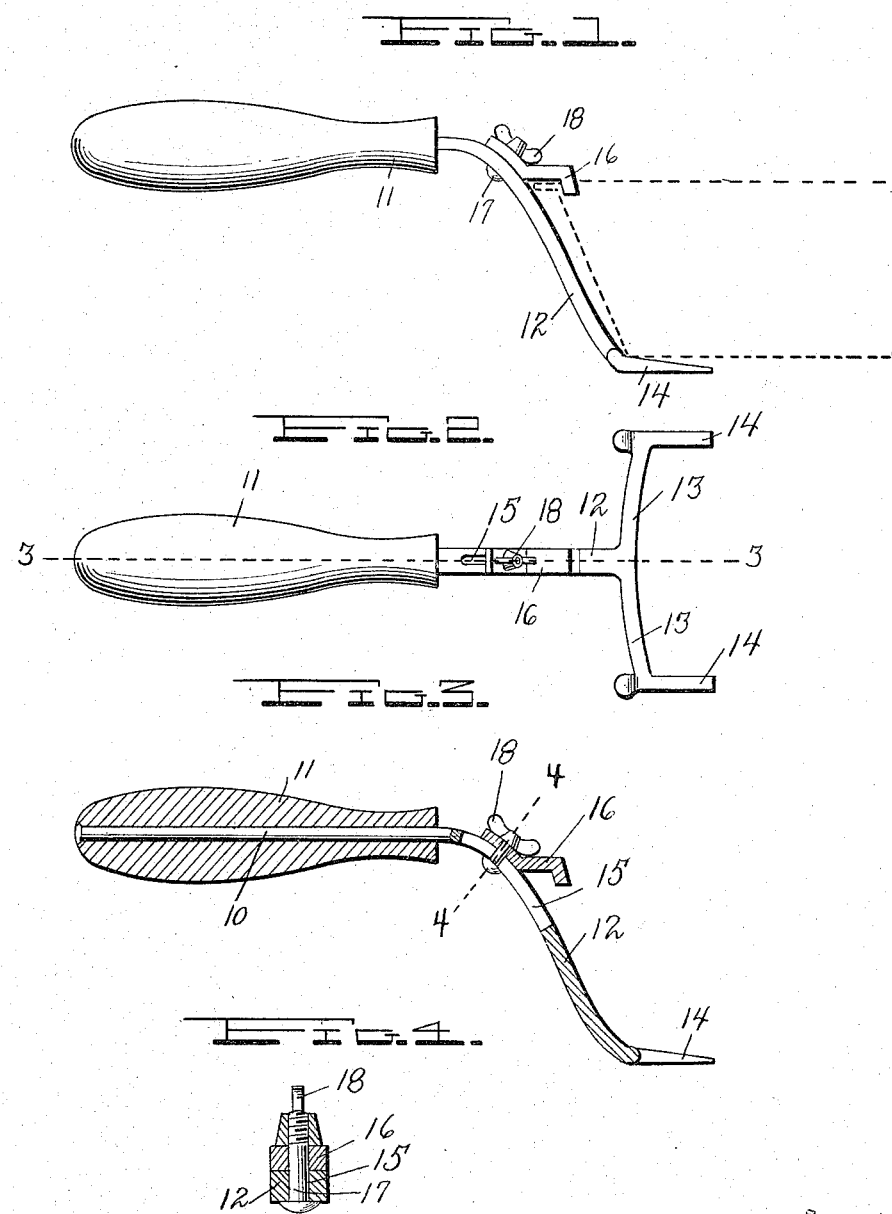

FRED C. MULLIN, OF SHARPS, VIRGINIA.

PAN-LIFTER.

1,177,205.  Specification of Letters Patent.  Patented Mar. 28, 1916.

Application filed April 20, 1914. Serial No. 833,156.

*To all whom it may concern:*

Be it known that I, FRED C. MULLIN, a citizen of the United States, residing at Sharps, in the county of Richmond, State of Virginia, have invented certain new and useful Improvements in Pan-Lifters; and I do hereby declare the following to be a full, clear, and exact description of the invention, such as will enable others skilled in the art to which it appertains to make and use the same.

This invention relates to improvements in lifters and particularly to devices for lifting hot pans.

The principal object of the invention is to provide a simple and novel device with which a pan may be lifted and carried from one point to another and which can be used for removing hot pans from the oven.

Another object is to provide a device of this character which can be quickly and easily adjusted for pans of different sizes.

Other objects and advantages will be apparent from the following description, when taken in connection with the accompanying drawings.

In the drawings: Figure 1 is a side elevation of the device in operative position. Fig. 2 is a top plan view of the device. Fig. 3 is a vertical longitudinal sectional view on the line 3—3 of Fig. 2. Fig. 4 is a transverse sectional view on the line 4—4 of Fig. 1.

Referring particularly to the accompanying drawings, 10 represents a metallic shank which is disposed within a suitable hand grip 11 formed preferably of a material which is a poor conductor of heat. The outer end of the shank is curved downwardly as indicated at 12 and branches off at right angles in opposite directions as indicated at 13, each of these branches having formed on its end a foot 14 extending away from the handle and in a plane parallel with the shank. Formed in the curved portion of the shank 12 is an elongated slot 15, and disposed against the shank is an angle member 16. A bolt 17 is passed through the slot 15 and through an opening in the angle member 16, said bolt being provided with a clamping nut 18 on its other end. Thus by manipulating the nut 18, the angle member 16 can be moved up and down on the member 12 throughout the curved extent of the latter. By this arrangement it is apparent that the pan gripping detent at the end of the angle member 16 will be inclined accordingly as the angle member is adjusted upon the curved or straight portions of the shank 12. This construction provides for the accommodation of pans of various diameters and depths, or pans having upper flanges of varying widths between the detent and the shank of the pan gripper.

The feet 14 are adapted to engage under the bottom of the pan and the angle member to engage over the upper edge of the rim of the pan, thus forming an efficient grip on the edge of the pan so that the same can be conveniently lifted and carried. The arrangement of the angle member 16 so that it can be moved up and down on the member 12, provides for adjustment of the device to pans of different depths. This adjustment can be quickly and easily accomplished by the bolt and nut before mentioned.

What is claimed is:

In a device of the class described, a shank curved longitudinally intermediate its ends and having a hand grip on one extremity, the opposite end of said shank being formed to provide laterally extending oppositely disposed branches, feet arranged in parallel relation and extending forwardly from the free ends of said branches, the said shank being provided throughout its curved and part of its straight portions with a longitudinally extending slot, a pan edge gripping member adapted to be adjusted longitudinally of said shank, said member having a curved foot at one end for engagement with said shank and being provided with an opening, a bolt for engagement through said opening and said slot, a nut for said bolt, and a down turned lug on the free end of said gripping member.

In testimony whereof, I affix my signature, in the presence of two witnesses.

FRED C. MULLIN.

Witnesses:
C. L. BUSSNER,
F. W. MOTLEY.

Copies of this patent may be obtained for five cents each, by addressing the "Commissioner of Patents, Washington, D. C."